US005584358A

United States Patent [19]
Stone et al.

[11] Patent Number: 5,584,358
[45] Date of Patent: Dec. 17, 1996

[54] CLIMBING TREE STAND

[76] Inventors: Charles E. Stone, R.D. #2 - Box 58;
William Rogers, R.D. #3 - Box 316A,
both of Meshoppen, Pa. 18630

[21] Appl. No.: 480,394

[22] Filed: Jun. 7, 1995

[51] Int. Cl.⁶ .................................................. A01M 31/02
[52] U.S. Cl. ............................................ 182/135; 182/187
[58] Field of Search ................................ 182/133–136, 182/187, 188

[56] References Cited

U.S. PATENT DOCUMENTS

| | | | |
|---|---|---|---|
| 3,856,111 | 12/1974 | Baker | 182/135 |
| 4,230,203 | 10/1980 | Sweat | 182/187 X |
| 4,417,645 | 11/1983 | Untz | 182/135 |
| 4,989,766 | 2/1991 | Lewallyn | 182/187 X |
| 5,310,019 | 5/1994 | Paul | 182/135 X |

Primary Examiner—Alvin C. Chin-Shue

[57] ABSTRACT

A climbing tree stand comprised of a platform having a V-shaped front edge. The platform has a pair of L-shaped brackets secured thereto on opposing sides thereof. A pair of sleeves are secured to the L-shaped bracket of the platform. A tree clevis has securement poles extending outwardly from end portions thereof. The securement poles are telescopically received within open ends of the pair of sleeves and engaged thereto by a bolt and wing nut. A clevis blade having a sharpened front edge is secured to the front edge of the platform with the sharpened front edge extending outwardly of the front edge of the platform.

4 Claims, 4 Drawing Sheets

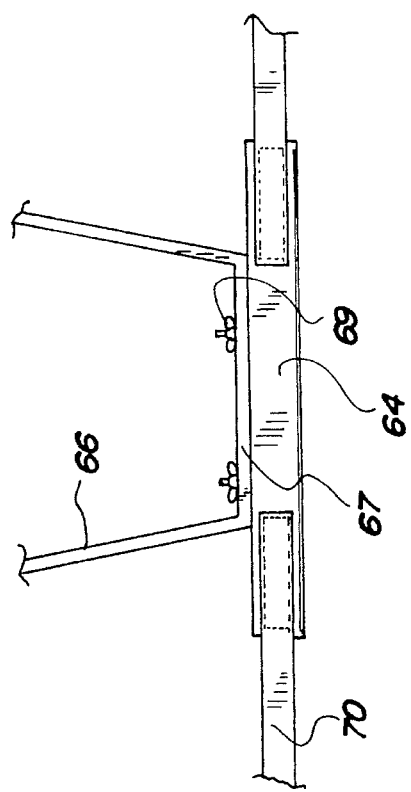
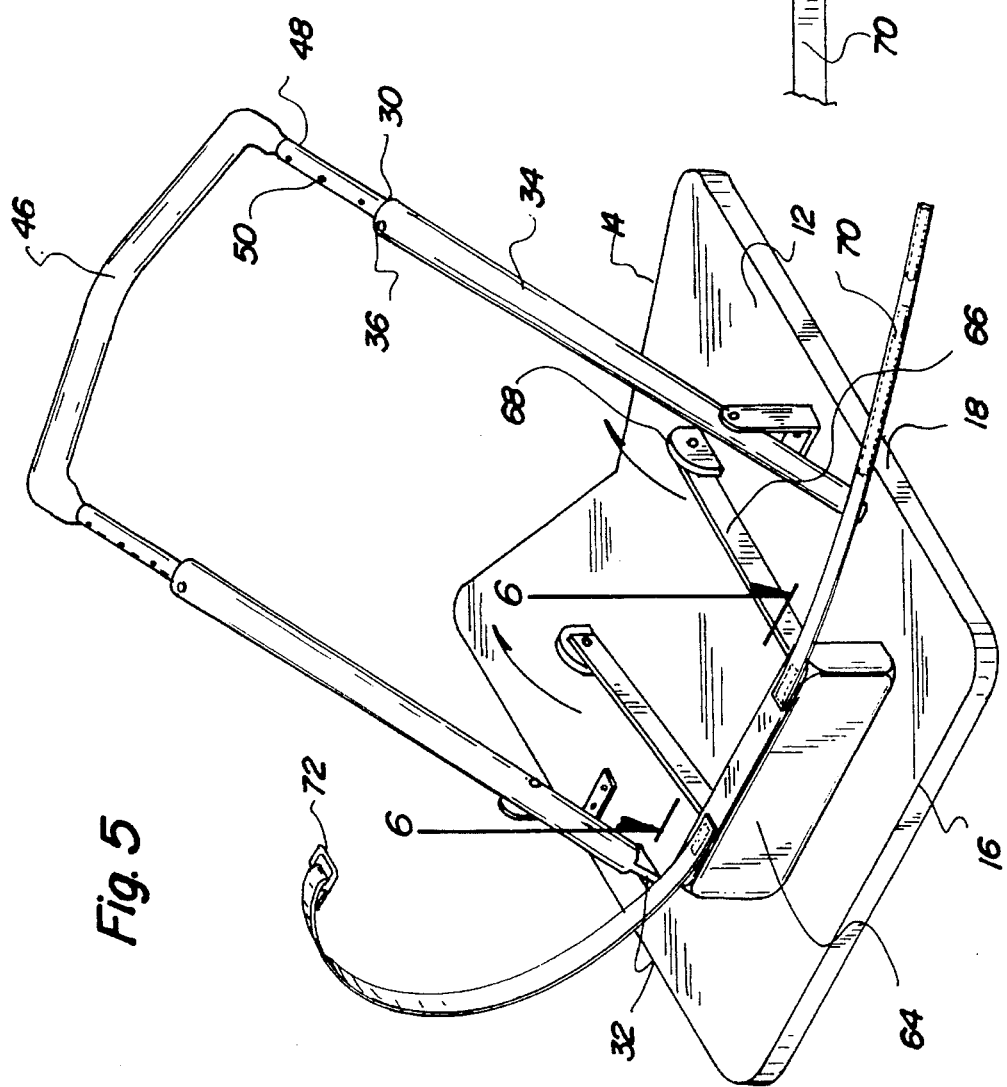

CLIMBING TREE STAND

BACKGROUND OF THE INVENTION

1. Field of the Invention

The present invention relates to a climbing tree stand and more particularly pertains to allowing a user to position themselves on a tree stand to perform various activities with a climbing tree stand.

2. Description of the Prior Art

The use of climbing tree stands is known in the prior art. More specifically, climbing tree stands heretofore devised and utilized for the purpose of ascending and descending trees are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,234,077 to Sheriff discloses a hunting tree stand.

U.S. Pat. No. 5,234,076 to Louk et al. discloses a tree stand.

U.S. Pat. No. 5,156,236 to Gardner discloses a climbing tree stand.

U.S. Pat. No. 5,143,176 to Burdette discloses a climbing tree stand.

U.S. Pat. No. 3,955,645 to Dye discloses a tree climbing stand and loop.

U.S. Pat. No. 4,417,645 to Untz discloses a porta climb climbing tree stand.

While these devices fulfill their respective, particular objective and requirements, the aforementioned patents do not describe a climbing tree stand for allowing a user to position themselves on a tree stand to perform various activities.

In this respect, the climbing tree stand according to the present invention substantially departs from the conventional concepts and designs of the prior art, and in doing so provides an apparatus primarily developed for the purpose of allowing a user to position themselves on a tree stand to perform various activities.

Therefore, it can be appreciated that there exists a continuing need for new and improved climbing tree stand which can be used for allowing a user to position themselves on a tree stand to perform various activities. In this regard, the present invention substantially fulfills this need.

SUMMARY OF THE INVENTION

In the view of the foregoing disadvantages inherent in the known types of climbing tree stands now present in the prior art, the present invention provides an improved climbing tree stand. As such, the general purpose of the present invention, which will be described subsequently in greater detail, is to provide a new and improved climbing tree stand and method which has all the advantages of the prior art and none of the disadvantages.

To attain this, the present invention essentially comprises a platform having a front edge, a rear edge, and two side edges. The front edge is V-shaped. The platform has a slotted aperture therethrough inwardly of each of the two side edges. The platform has an L-shaped bracket secured thereto adjacent to each slotted aperture. The device contains a pair of sleeves. Each of the sleeves has an open first end, a flattened second end, and an intermediate extent therebetween. Each sleeve has an aperture therethrough downwardly of the open first end. Each flattened second end has an aperture formed therethrough. Each flattened second end is dimensioned to be extended through each slotted aperture in the platform. A steel dowel extends between the apertures formed through each flattened second end for securement of the pair of sleeves beneath a lower surface of the platform. Each intermediate extent is secured to the L-shaped bracket of the platform. The device contains a tree clevis having securement poles extending outwardly from end portions thereof. Each of the securement poles has a plurality of vertically aligned apertures formed therethrough. The securement poles are telescopically received within the open first end of the pair of sleeves with one of the plurality of apertures selectively aligning with the aperture of the pair of sleeves and engaged thereto by a bolt and wing nut. The device contains a clevis blade having a sharpened front edge. The clevis blade is secured to the front edge of the platform with the sharpened front edge extending outwardly of the front edge of the platform.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved climbing tree stand which has all the advantages of the prior art climbing tree stands and none of the disadvantages.

It is another object of the present invention to provide a new and improved climbing tree stand which may be easily and efficiently manufactured and marketed.

It is a further object of the present invention to provide a new and improved climbing tree stand which is of durable and reliable construction.

An even further object of the present invention is to provide a new and improved climbing tree stand which is susceptible of a low cost of manufacture with regard to both materials and labor, and which accordingly is then susceptible of low prices of sale to the consuming public, thereby making such a climbing tree stand economically available to the buying public.

Still yet another object of the present invention is to provide a new and improved climbing tree stand which provides in the apparatuses and methods of the prior art some of the advantages thereof, while simultaneously overcoming some of the disadvantages normally associated therewith.

Even still another object of the present invention is to provide a new and improved climbing tree stand for allowing a user to position themselves on a tree stand to perform various activities.

Lastly, it is an object of the present invention to provide a new and improved climbing tree stand comprised of a platform having a V-shaped front edge. The platform has a pair of L-shaped brackets secured thereto on opposing sides thereof. A pair of sleeves are secured to the L-shaped bracket of the platform. A tree clevis has securement poles extending outwardly from end portions thereof. The securement poles are telescopically received within open ends of the pair of sleeves and engaged thereto by a bolt and wing nut. A clevis blade having a sharpened front edge is secured to the front edge of the platform with the sharpened front edge extending outwardly of the front edge of the platform.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a perspective view of a second embodiment of the present invention.

FIG. 6 is a cross-sectional view as taken along line 6—6 of FIG. 5.

The same reference numerals refer to the same parts through the various Figures.

DESCRIPTION OF THE PREFERRED EMBODIMENT

Figure 1:
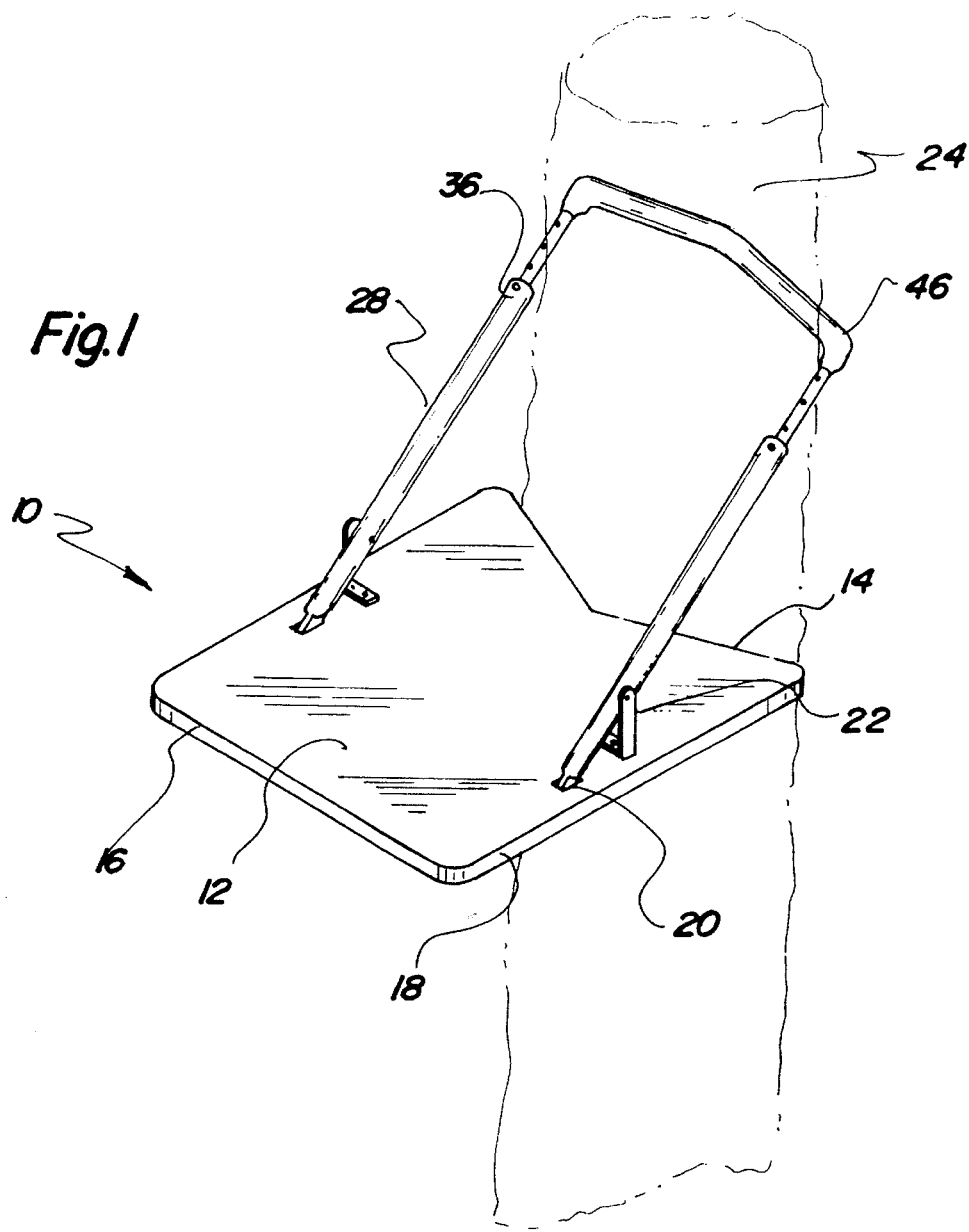
FIG. 1 is a perspective view of the preferred embodiment of the climbing tree stand constructed in accordance with the principles of the present invention.
Figure 2:
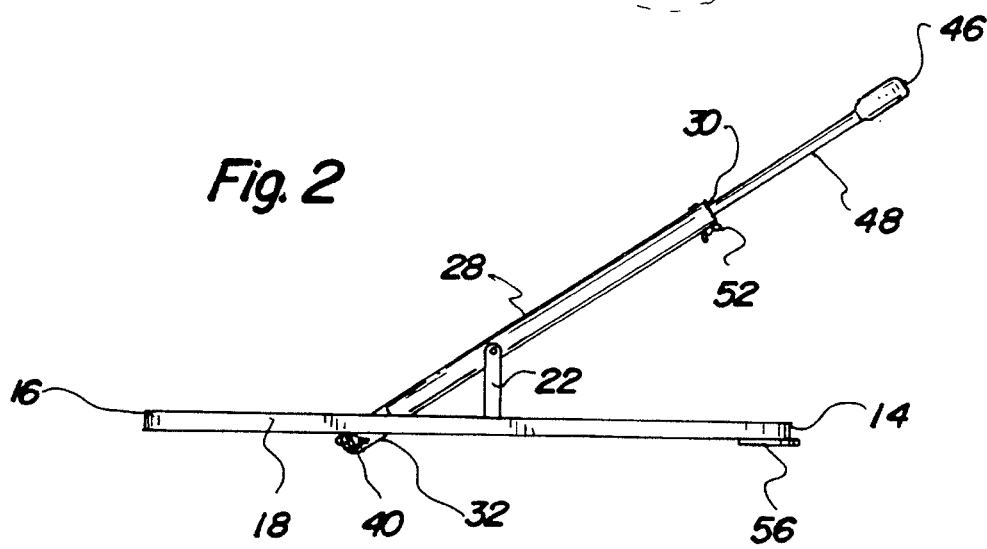
FIG. 2 is a side elevation view of the present invention.
Figure 3:
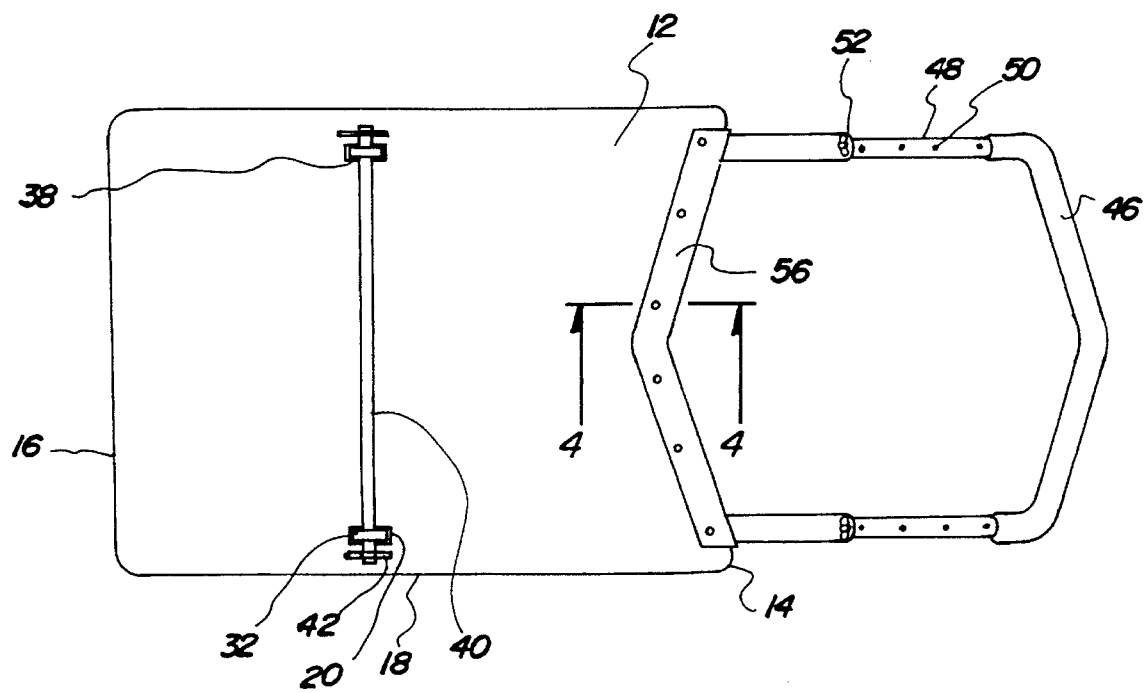
FIG. 3 is a bottom view of the preferred embodiment of the present invention.
Figure 4:
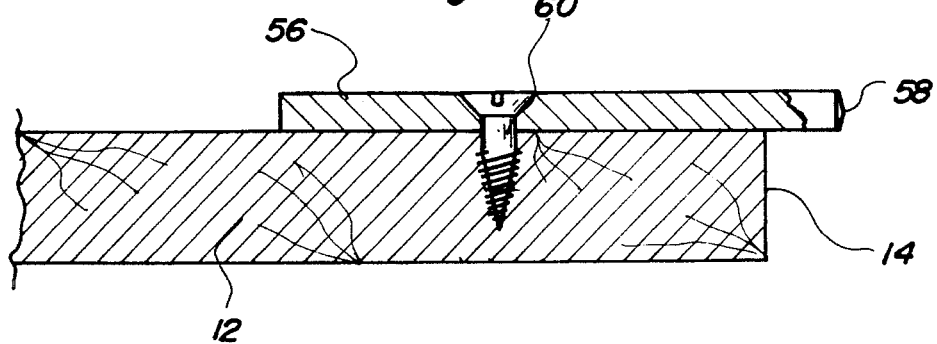
FIG. 4 is a cross-sectional view as taken along line 4—4 of FIG. 3.
Figure 7:
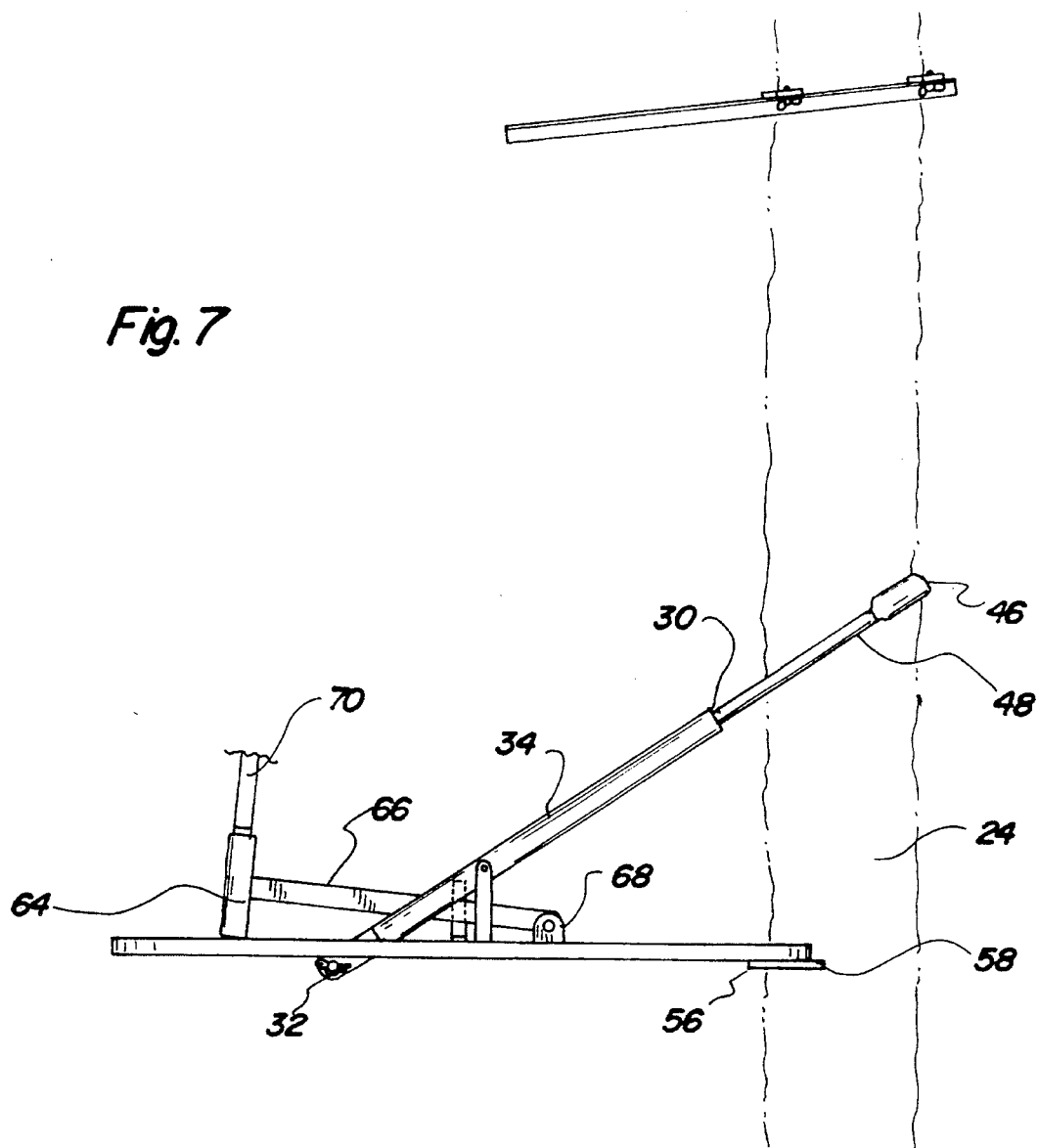
FIG. 7 is a side elevation view of a third embodiment of the present invention.

With reference now to the drawings, and in particular, to FIGS. 1–8 thereof, the preferred embodiment of the new and improved climbing tree stand embodying the principles and concepts of the present invention and generally designated by the reference number 10 will be described.

Specifically, it will be noted in the various Figures that the device relates to a new and improved climbing tree stand for allowing a user to position themselves on a tree stand to perform various activities. In its broadest context, the device consists of a platform, a pair of sleeves, a tree clevis, and a clevis blade.

The first component of the device 10 is a platform 12. The platform 12 has a front edge 14, a rear edge 16, and two side edges 18. The front edge 14 is V-shaped. The platform 12 has a slotted aperture 20 therethrough inwardly of each of the two side edges 18. The platform 12 has an L-shaped bracket 22 secured thereto adjacent to each slotted aperture 20. The platform 12 is generally rectangular in configuration. The V-shape of the front edge 14 allows for the platform 12 to be more tightly positioned against a tree 24. Each L-shaped bracket 22 is secured to the PLATFORM BY a thumb screw allowing for their easy removal.

The second component of the device 10 is a pair of sleeves 28. Each of the sleeves 28 has an open first end 30, a flattened second end 32, and an intermediate extent 34 therebetween. Each sleeve 28 has an aperture 36 therethrough downwardly of the open first end 30. Each flattened second end 32 has an aperture 38 formed therethrough. Each flattened second end 32 is dimensioned to be extended through each slotted aperture 20 in the platform 12. A steel dowel 40 extends between the apertures 38 formed through each flattened second end 32 for securement of the pair of sleeves 28 beneath a lower surface of the platform 12. The steel dowel 40 is secured between the flattened second end 32 of each sleeve by pull pins 42 through opposing ends thereof. This allows for the steel dowel 40 to be easily removed thereby allowing the pair of sleeves 28 to be easily removed from the platform 12. Each intermediate extent 34 is secured to the L-shaped bracket 22 of the platform 12. Each intermediate extent is secured to the L-shaped brackets 22 by a thumb screw allowing for easy removal.

The third component of the device is a tree clevis 46. The tree clevis 46 has securement poles 48 extending outwardly from end portions thereof. Each of the securement poles 48 has a plurality of vertically aligned apertures 50 formed therethrough. The securement poles 48 are telescopically received within the open first end 30 of the pair of sleeves 28 with one of the plurality of apertures 50 selectively aligning with the aperture 36 of the pair of sleeves 28 and engaged thereto by a bolt and wing nut 52. After the platform 12 is positioned against the tree 24, the tree clevis 46 is positioned on an opposing side of the tree 24 and the securement poles 48 are inserted into the open first ends 30 of the pair of sleeves 28 and secured through aligning apertures by the bolt and wing nut 52.

The fourth component of the device 10 is a clevis blade 56. The clevis blade 56 has a sharpened front edge 58. The clevis blade 56 is secured to the front edge 14 of the platform 12 with the sharpened front edge 58 extending outwardly of the front edge 14 of the platform 12. The clevis blade 56 is secured to the front edge 14 of the platform 12 by a plurality of wood screws 60. The clevis blade 56 helps to eliminate any danger of the platform 12 sliding while it is attached to the tree 24.

A second embodiment of the present invention is shown in FIG. 5 and includes substantially all of the components of the present invention further including a seat portion 64. The seat portion 64 has two legs 66 extending downwardly from a lower portion thereof. The two legs 66 have a pivoting portion 68 secured to ends thereof. The pivoting portion 68 of the two legs 66 are secured to the platform 12. The two legs 66 are formed as an inverted U-shape with the lower part 67 of the U secured to the lower portion of the seat portion 64 by bolts and wing nuts 69. The seat portion 64 has securement straps 70 extending from a rear portion thereof. One of the securement straps 70 has a buckle 72 thereon for the adjustable coupling with the other securement strap 70 around a waist of a user. The seat portion 64 can be simply raised or lowered when needed by the user. The user's weight will support the seat portion 64 when in the raised position with the securement straps 70 safely preventing the user from falling off of the platform 12 in case he/she falls asleep.

Figure 8:
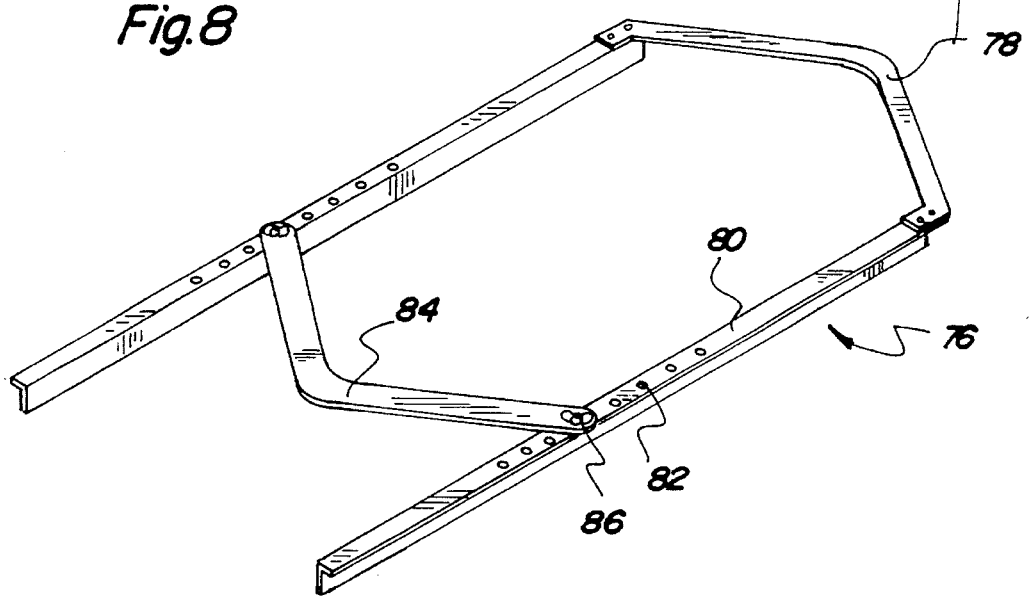
FIG. 8 is a perspective view of the climber of the third embodiment of the present invention.

A third embodiment of the present invention is shown in FIG. 8 and includes substantially all of the components of the present invention and further including a climber 76. The climber 76 has an inwardly facing clevis 78. The inwardly facing clevis 78 has two legs 80 extending from end portions thereof. The two legs 80 have a plurality of vertically aligned apertures 82 therethrough. The climber 76 has an outwardly facing clevis 84 with apertures formed through end portions thereof. The apertures selectively align with the plurality of apertures 82 of the two legs 80 and are secured thereto by a bolt and wing nut 86. The outwardly facing clevis 84 is adjusted inwardly or outwardly depending on the width of the tree 24 that is being climbed. The climber 76 is used with the device 10 to climb further up the tree 24. The outwardly facing clevis 84 and the inwardly clevis 78 reduce the margin of error for accidents when climbing trees.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A climbing tree stand for allowing a user to position themselves on a tree stand to perform various activities comprising, in combination:

a platform having a V-shaped front edge, the platform having a pair of L-shaped brackets secured thereto on opposing sides thereof;

a pair of sleeves secured to the L-shaped bracket of the platform, the pair of sleeves each having an end portion extending through the platform inwardly of opposed side edges thereof for removable coupling thereto;

a tree clevis having securement poles extending outwardly from end portions thereof, the securement poles telescopically received within open ends of the pair of sleeves and engaged thereto by a bolt and wing nut;

a clevis blade having a sharpened front edge, the clevis blade secured to the front edge of the platform with the sharpened front edge extending outwardly of the front edge of the platform.

2. A climbing tree stand for allowing a user to position themselves on a tree stand to perform various activities comprising, in combination:

a platform having a front edge, a rear edge, and two side edges, the front edge being V-shaped, the platform having a slotted aperture therethrough inwardly of each of the two side edges, the platform having an L-shaped bracket secured thereto adjacent to each slotted aperture;

a pair of sleeves, each of the sleeves having an open first end, a flattened second end, and an intermediate extent therebetween, each sleeve having an aperture therethrough downwardly of the open first end, each flattened second end having an aperture formed therethrough, each flattened second end dimensioned to be extended through each slotted aperture in the platform, a steel dowel extending between the apertures formed through each flattened second end for securement of the pair of sleeves beneath a lower surface of the platform, each intermediate extent secured to the L-shaped bracket of the platform;

a tree clevis having securement poles extending outwardly from end portions thereof, each of the securement poles having a plurality of vertically aligned apertures formed therethrough, the securement poles telescopically received within the open first end of the pair of sleeves with one of the plurality of apertures selectively aligning with the aperture of the pair of sleeves and engaged thereto by a bolt and wing nut;

a clevis blade having a sharpened front edge, the clevis blade secured to the front edge of the platform with the sharpened front edge extending outwardly of the front edge of the platform.

3. The tree stand as described in claim 1 and further including a seat portion having two legs extending downwardly from a lower portion thereof, the two legs having a pivoting portion secured to ends thereof, the pivoting portion of the two legs secured to the platform, the seat portion having securement straps extending from a rear portion thereof, one of the securement straps having a buckle thereon for the adjustable coupling with the other securement strap around a waist of a user.

4. The tree stand as described in claim 3 and further including a climber, the climber having an inwardly facing clevis, the inwardly facing clevis having two legs extending from end portions thereof, the two legs having a plurality of vertically aligned apertures therethrough, the climber having an outwardly facing clevis with apertures formed through end portions thereof, the apertures selectively aligning with the plurality of apertures of the two legs and secured thereto by a bolt and wing nut.

\* \* \* \* \*